United States Patent Office 3,799,951
Patented Mar. 26, 1974

3,799,951
AMINO CITRIC ACID DERIVATIVES
Robert William Guthrie, Fairfield, and Richard Wightman Kierstead, North Caldwell, N.J., assignors to Hoffmann-La Roche Inc., Nutley, N.J.
No Drawing. Filed Dec. 2, 1971, Ser. No. 204,290
Int. Cl. C07d *109/00*
U.S. Cl. 260—349    4 Claims

ABSTRACT OF THE DISCLOSURE

Amino citric acids and esters, and lactams thereof, of the formulas:

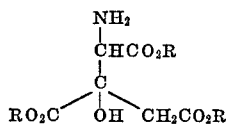

Ia and

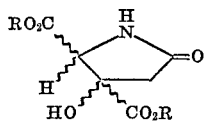

Ib wherein all R groups are hydrogen or the same lower alkyl, and the stereoisomers, optical antipodes and pharmaceutically acceptable salts thereof, which compounds inhibit fatty acid synthesis in biological systems and are thus useful in treatment of obesity and in correcting conditions of lipid abnormalities. Additionally, epoxide, azide and sulfonate ester intermediates are disclosed.

BRIEF DESCRIPTION OF THE INVENTION

The present invention relates to novel compounds of the formulas

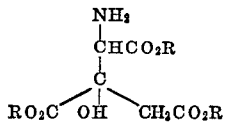

Ia and

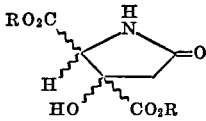

Ib wherein all R groups are hydrogen or the same lower alkyl, and the stereoisomers, optical antipodes and pharmaceutically acceptable salts thereof, which compounds inhibit fatty acid synthesis in biological systems and are thus useful in treatment of obesity and in correcting conditions of lipid abnormalities.

As used throughout the specification and the appended claims, the term "lower alkyl" shall mean a straight or branched chain hydrocarbon group containing no unsaturation and having up to and including 8 carbon atoms, such as methyl, ethyl, hexyl, isopropyl, tert.-butyl and so forth. The term "aryl" shall mean phenyl or naphthyl which may be substituted with one of the following groups: halogen (i.e. chlorine, bromine, iodine or fluorine), lower alkyl, hydroxy, lower alkoxy or nitro.

The preparation of compounds of Formulas Ia and Ib is illustrated in Reaction Scheme A. The structural formulas depicted herein as drawn do not illustrate the relative or absolute stereochemistry of the particular molecules. It should be understood, however, that all of the compounds described herein exist in two relative stereochemical forms: a threo and erythro form. To facilitate the description of stereochemical transformations reported herein, the threo and erythro nomenclature as defined by Cram et al., J. Amer. Chem. Soc., vol. 74, p. 5828 (1952) and by Prelog et al., Experientia, vol. 12, p. 81 (1956) has been adopted. Each of these relative stereochemical forms exists as a racemate and the two optical antipodes, and the formulas shown herein are meant to include all of the isomeric and antipodal forms of the compounds depicted. The preparation of sulfonyl ester of Formula II and epoxide of Formula III is described in the U.S. patent application of Guthrie, et al., filed of even date herewith, entitled Citric Acid Derivatives, Ser. No. 204,334.

Sulfonyl ester, Compound II, can be converted to azido-alcohol of Formula IV by treatment with an alkali metal azide such as, for example, sodium azide. The reaction may be carried out in any inert organic solvent, such as for example, lower alkanols, e.g. methanol or ethanol; ketones, e.g. acetone; organic amides, e.g. N,N-dimethyl formamide; and so forth. The reaction temperature can range from about 20 to 150° C. A preferred reaction temperature is in the range of from about 50 to about 100° C. Surprisingly, it has been found that the replacement of the sulfonyloxy group by the azido group occurs with retention of configuration. Thus, for example, threo-mesylate of Formula II affords threo-azide of Formula IV. It has been found that, during the course of the reaction, the epoxide of Formula III is an intermediate, that is, a double inversion of configuration amounting to net retention of configuration occurs. Thus, for example, threo-mesylate goes through erythro-epoxide which then opens to afford threo-azide. The epoxide of Formula III is not normally isolated during the reaction but its presence can be detected by spectral and/or chromatographic methods. Alternatively, one may start with the epoxide of Formula III and treat it with an alkali metal azide under the aforedescribed reaction conditions to obtain the desired azide. Following the above reasoning, threo-epoxide affords erythro-azide, and so forth.

REACTION SCHEME A

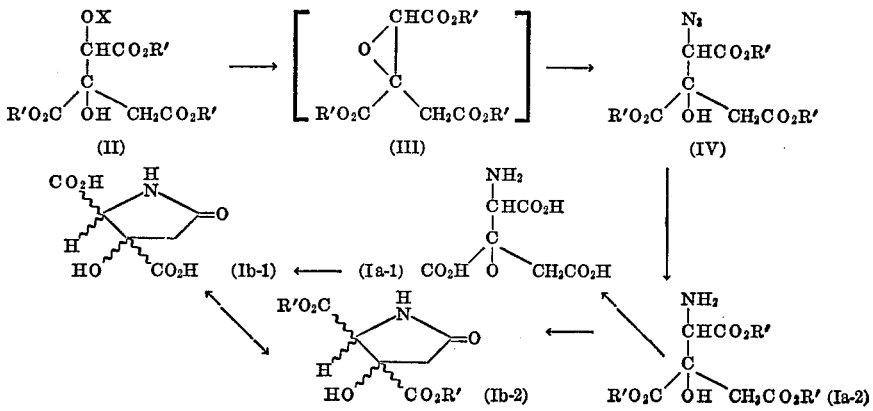

wherein all R' groups are the same lower alkyl and X is lower alkylsulfonyl or aryl sulfonyl.

In the next step, the azido alcohol of Formula IV is reduced to amino alcohol of Formula Ia–2. A preferred method of reduction of the azido group to the amino group is catalytic hydrogenation. Suitable catalysts are metal-comprising catalysts, such as palladium, platinum, rhodium, nickel, and the like. The catalyst may be unsupported or may be present on a support such as carbon, asbestos, barium sulfate, strontium carbonate, and so forth. A preferred catalyst is palladium supported on carbon. Any inert organic solvent may be utilized as a reduction medium, for example, alcohols, e.g. methanol or ethanol; ethers, e.g. tetrahydrofuran or dioxane; hydrocarbons, e.g. hexane or benzene; and so forth. Preferred solvents are lower alcohols, e.g. methanol or ethanol. The parameters of temperature and pressure are not narrowly critical. The temperature may range from about room temperature to about 100° C., and the pressure from atmospheric pressure to about 50 atmospheres. Generally, a temperature of about room temperature and a pressure of about 3 atmospheres is utilized. The hydrogenation reaction may be conducted in the presence of an added strong acid such as a mineral acid, e.g. hydrogen chloride, which serves to trap the amine as it is formed. In a preferred hydrogenation reaction about 1 equivalent of mineral acid is present in the reaction mixture.

The amino citric acids of Formula Ia–2 may be converted to those of Formula Ia–1 by hydrolysis of the ester functions. The hydrolysis may be carried out in aqueous media in the presence of a strong acid or a strong base.

The compounds of Formulas Ia–1 and Ia–2 may be cyclized to the corresponding lactams of Formulas Ib–1 and Ib–2, respectively, in a variety of ways. In one example, the free amine of Formula Ia–1 or Formula Ia–2 may be heated in an inert solvent to effect the cyclization. Suitable solvents include alcohols, e.g. methanol or ethanol; ethers, e.g. tetrahydrofuran or dioxane; hydrocarbons, e.g. toluene; and so forth. A reaction temperature of from about 50 to 100° is operable, although heating at the reflux point of the solvent is generally preferred. This cyclization technique is not preferred for the cyclization of the threo-amino alcohol because some isomerization of the threo-amino alcohol to the erythro-amino alcohol occurs. A preferred method is to pyrolyze the acid addition salt of the amino alcohol. It is most preferable to utilize the same acid addition salt obtained from the hydrogenation of the azide in the presence of acid. The pyrolysis is conveniently effected in the dry state by heating the acid addition salt above its melting point until cyclization occurs. A high-boiling inert organic solvent can be employed as a diluent, if desired, although this is not normally preferred.

Lactams of Formulas Ib–1 and Ib–2 can be interconverted by conventional esterification and saponification techniques.

Optically active compounds of Formulas Ia and Ib may be prepared either by utilizing optically active starting materials of, for example, Formula II, or by optical resolution. Compounds of Formula Ia–2 may be resolved utilizing an optically active acid, such as an antipode of, for example, camphorsulfonic acid, tartaric acid, and so forth. The lactam of Formula Ib–1 may be resolved utilizing an optically active base, such as for example, cinchonidine, α-methylbenzylamine, and so forth.

The compounds of Formulas Ia and Ib are useful for inhibiting fatty acid synthesis in biological systems. The biological systems in which the compounds of the present invention may be used include those which contain citrate cleavage enzyme. Preferred biological systems are mammals, particularly non-ruminating mammals.

The inhibition of fatty acid synthesis in biological systems, by the use of the compounds of the present invention is believed to arise from the inhibition of citrate cleavage enzyme contained in such systems. The cleavage of citrate is catalyzed by citrate cleavage enzyme according to the stoichiometry:

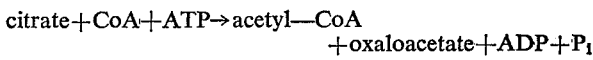

In the conversion of carbohydrates and various amino acids to fat by nonruminating mammals, citrate is the major source of acetyl coenzyme A which is utilized for the synthesis of fatty acids. Citrate is formed in the mitochondria by the citrate synthase reaction. It is then metabolized via the citric acid cycle. Under conditions when energy intake exceeds energy demand some citrate is diverted to the extra-mitochondrial space of the cell where it is used for fatty acid synthesis, that is to say, for energy storage.

The novel compounds of Formulas Ia and Ib of the present invention are thus useful in the treatment of obesity and in the correction of lipid abnormalities. The compounds of Formulas Ia and Ib may also be utilized in the form of the pharmaceutically acceptable nontoxic salts. When R is hydrogen, a salt can be formed with a suitable base. Preferred salts for this purpose include the alkali metals, e.g. sodium or potassium; the alkaline earth metals, e.g. calcium; or complex salts such as ammonium or substituted ammonium salts such as a mono-, di or tri-alkyl ammonium salt or a mono-, di- or tri-hydroxy-alkyl ammonium salt. Compounds of Formula Ia can also form salts with suitable acids. Preferred acids include mineral acids, e.g. hydrochloric acid; organic acids, e.g. maleic acid, acetic acid, and so forth.

The compounds can be made up in the form of conventional pharmaceutical preparations; for example, the aforesaid compounds can be mixed with organic or inorganic inert pharmaceutical carriers suitable for parenteral or enteral administration such as, for example, water, gelatin, lactose, starch, magnesium stearate, talc, vegetable oil, gums or the like. They can be administered in conventional pharmaceutical forms, e.g. solid forms, for example, tablets, capsules, dragees, suppositories, or the like; or in liquid forms, for example, solutions, suspensions, or emulsions. Moreover, the pharmaceutical compositions containing the compounds of this invention can be subjected to the conventional pharmaceutical expedients, such as sterilization, and can contain conventional pharmaceutical excipients such as preservatives, stabilizing agents, emulsifying agents, salts for the adjustment of osmotic pressure or buffers. The compositions can also contain other therapeutically active materials.

A suitable pharmaceutical dosage unit can contain from abut 15 to 600 mg. of the aforesaid compound.

Suitable parenteral dosage regimens in mammals comprise from about 1 mg./kg. to about 25 mg./kg. per day. However, for any particular subject, specific dosage regimens should be adjusted according to the individual need and the professional judgment of the person administering or supervising the administration of the aforesaid compounds. It is to be understood that the dosages set forth herein are exemplary only that they do not, to any extent, limit the scope or practice of the invention.

The present invention may be more clearly illustrated by the following examples. All temperatures are stated in degrees centigrade.

EXAMPLE 1

(±)-Threo-1-azido-2-hydroxy-1,2,3-propanetricarboxylic acid, trimethyl ester (a) From the (±)-threo-mesylate—A solution of sodium azide (5.2 g.) in water (20 ml.) was added to a stirred solution of (±)-threo-1-mesyloxy-2-hydroxy-1,2,3-propanetricarboxylic acid, trimethyl ester (13.12 g.) in ethanol (100 ml.) and the mixture was heated at reflux for 45 minutes. The reaction mixture was cooled and most of the solvent was removed under reduced pressure. The residue was partitioned using chloroform (2×250 ml.) and water (100 ml.). The combined chloroform extracts were washed with water (100 ml.) then were dried (MgSO$_4$) and concentrated to dryness to give the azide as an oil. It was identical to that obtained from the ($\pm$)-erythro epoxide (see below).

(b) From the ($\pm$)-erythro epoxide—A solution of sodium azide (1.12 g.) in water (5 ml.) was added to a solution of ($\pm$)-erythro-1,2-epoxy-1,2,3-propanetricarboxylic acid, trimethyl ester [($\pm$)-erythro-epoxyaconitic acid, trimethyl ester] (1.89 g.) in ethanol (20 ml.) containing acetic acid (540 mg.). The mixture was heated at reflux for 25 minutes then cooled and concentrated in vacuo. The resulting residue was taken up in chloroform and the chloroform solution was washed with water (3×). The aqueous layers were backwashed with chloroform and the combined organic extracts were dried (MgSO$_4$) and evaporated under reduced pressure to give the azide as an oil. The oil was triturated with cold ether to give the azide as a white solid, M.P. 43–46° C. The analytically pure material was obtained from the same solvent, M.P. 47–48°.

*Analysis.*—Calcd. for C$_9$H$_{13}$N$_3$O$_7$: C, 39.28; H, 4.76; N, 15.27. Found: C, 39.55; H, 4.65; N, 15.32.

EXAMPLE 2

($\pm$)-Threo-1-amino-2-hydroxy-1,2,3-propanetricarboxylic acid, trimethyl ester, hydrochloride A solution of crude azide prepared as in Example 1 (9.9 g.) in methanol (150 ml.) containing concentrated hydrochloric acid (2.7 ml.) was hydrogenated (50 p.s.i., R. T.) for three hours using 10% palladium on charcoal (1.6 g.) as catalyst. The catalyst was removed by filtration through Celite and the filtrate was concentrated to dryness under reduced pressure to give a white solid. Crystallization from methanol-ether furnished the ($\pm$)-threo-amine hydrochloride, M.P. 161–3°. The same solvent system furnished the analytically pure specimen, M.P. 161–161.5°.

*Analysis.*—Calcd. for C$_9$H$_{15}$NO$_7$·HCl: C, 37.84; H, 5.65; N, 4.90; Cl$^-$, 12.41. Found: C, 37.97; H, 5.70; N, 4.92; Cl$^-$, 12.43.

EXAMPLE 3

($\pm$)-Threo-1-amino-2-hydroxy-1,2,3-propanetricarboxylic acid, $\gamma$-lactam, dimethyl ester 3.5 g. of the ($\pm$)-amine hydrochloride prepared as in Example 2 was placed in a 125 ml. Erlenmeyer flask and the vessel was flushed with argon. The flask was then placed in an oil bath preheated to 180°. A slow stream of argon was swept through the flask during the reaction. After the compound had melted and the bubbling had ceased (2–3 minutes) the flask was cooled and the pyrolysate was dissolved in ethyl acetate (with the help of a small volume of methanol) and placed on a column of Florisil (60–100 mesh; 70 g.) and eluted with 2% methanol in ethyl acetate. Concentration of the eluates (1800 ml.) furnished the lactam. Crystallization from methanol-ethyl acetate afforded pure lactam, M.P. 144–6°. The analytical sample was obtained from the same solvent system, M.P. 144–6°.

*Analysis.*—Calcd. for C$_8$H$_{11}$NO$_6$: C, 44.24; H, 5.11; N, 6.45. Found: C, 44.45; H, 5.28; N, 6.33.

EXAMPLE 4

A solution of potassium t-butoxide (225 mg.; 2.0 mmole) in dry methanol (10 ml.) was added to a solution of the hydrochloride prepared as in Example 3 (571 mg.; 2.0 mmol) in methanol (10 ml.) and the solution was heated at reflux for two hours. The solvent was removed in vacuo and the solid residue was extracted with several portions of hot ethyl acetate (3× 30 ml.). The combined extracts were decolorized (charcoal), then filtered and evaporated to dryness under reduced pressure to give an oil. Analysis of this oil showed it to be a mixture of the threo-lactam and the ($\pm$)-erythro-lactam.

EXAMPLE 5

($\pm$)-Threo-1-amino-2-hydroxy-1,2,3-propanetricarboxylic acid, $\gamma$-lactam A solution of the threo-diester lactam prepared as in Example 4 (540 mg.; 2.5 mmol) in 1 N sodium hydroxide solution (6.25 ml.; 6.25 mmol) was allowed to stand at room temperature for 25 minutes. The solution was then passed through a column of cation exchange resin (Amberlite IRA 120; 10 ml.). The acidic eluate was concentrated in vacuo to give a white solid. Recrystallization from methanol-carbon tetrachloride furnished the analytically pure material, M.P. 222–3°.

*Analysis.*—Calcd. for C$_6$H$_7$NO$_6$: C, 38.11; H, 3.73; N, 7.41. Found: C, 38.01; H, 3.62; N, 7.33.

EXAMPLE 6

($\pm$)-Erythro-1-azido-2-hydroxy-1,2,3-propanetricarboxylic acid, trimethyl ester A solution of sodium azide (2.5 g.) in water (10 ml.) was added to a solution of ($\pm$)-erythro-1-mesyloxy-2-hydroxy-1,2,3-propanetricarboxylic acid, trimethyl ester (6.56 g.) in ethanol (50 ml.). The reaction mixture was heated at reflux temperature for two hours then most of the solvent was removed in vacuo. The residue was dissolved in chloroform and the solution was washed with water (2×), dried (MgSO$_4$) and concentrated to dryness to give crude azide. The pure azide was obtained by crystallization from ether, M.P. 70–71°.

*Analysis.*—Calcd. for C$_9$H$_{13}$N$_3$O$_7$: C, 39.28; H, 4.76; N, 15.27. Found: C, 39.48; H, 4.89; N, 15.20.

EXAMPLE 7

($\pm$)-Erythro-1-amino-2-hydroxy-1,2,3-propanetricarboxylic acid, trimethyl ester, hydrochloride A solution of the crude ($\pm$)-erythro azide prepared as in Example 6 (4.9 g.) in methanol containing concentrated hydrochloric acid (1.33 ml.) was hydrogenated (50 p.s.i., R.T.) for two hours using 10% palladium on charcoal (800 mg.) as catalyst. The catalyst was removed by filtration of the reaction mixture through a bed of Celite. The filtrate was concentrated in vacuo and the resulting white solid was crystallized from methanol-ether to give the ($\pm$)-erythro-amine hydrochloride, M.P. 153–5°. Recrystallization from methanol-ether furnished the analytically pure material, M.P. 153–5°.

*Analysis.*—Calcd. for C$_9$H$_{15}$NO$_7$·HCl: C, 37.84; H, 5.65; N, 4.90; Cl$^-$, 12.41. Found: C, 38.01; H, 5.90; N, 4.88; Cl$^-$, 12.49.

EXAMPLE 8

($\pm$)-Erythro-1-amino-2-hydroxy-1,2,3-propanetricarboxylic acid, $\gamma$ lactam, dimethyl ester (a) 2.6 g. of the amine hydrochloride prepared as in Example 7 was placed in a 125 ml. Erlenmeyer flask under a slow stream of argon. The flask was immersed in a preheated oil bath (180°) until the hydrochloride had melted and the effervesence had stopped (2–3 minutes). The oily residue was then dissolved in ethyl acetate (using a minimum amount of methanol to effect solution) and placed on a column of Florisil (60–100 mesh; 55 g.) and eluted with 2% methanol in ethyl acetate. The eluate (750 ml.) was concentrated in vacuo to give an oil which slowly solidified. Crystallization of the product from ethyl acetate-carbon tetrachloride yielded the lactam diester, M.P. 133–135°. Recrystallization from the same solvent afforded the analytical sample, M.P. 133.5–135.5°.

*Analysis.*—Calcd. for C$_8$H$_{11}$NO$_6$: C, 44.24; H, 5.11; N, 6.45. Found: C, 44.54; H, 5.05; N, 6.29.

(b) To a stirred solution of the amine hydrochloride prepared as in Example 7 (571 mg.; 2.0 mmol) in dry methanol (10 ml.) was added a solution of potassium t-butoxide (225 mg.; 2.0 mmol) in dry methanol (10 ml.) to free the amine from its salt. The mixture containing the free amine was brought to reflux and maintained at that temperature for 3.5 hours. The cooled solution was decanted from the precipitated potassium chloride and the solvent was removed under reduced pressure. The residue was extracted with several portions (3×30 ml.) of hot ethyl acetate. The combined extracts were filtered to remove residual inorganic salts and then concentrated under reduced pressure. The oily residue solidified when triturated with ether to give lactam, M.P. 124–7°. This material was identical to the (±)-erythro lactam obtained above by pyrolysis of the amine hydrochloride.

EXAMPLE 9

(±)-Erythro-1-amino-2-hydroxy-1,2,3-propanetricarboxylic acid, γ lactam

A solution of the diester lactam prepared as in Example 8 (540 mg.; 2.5 mmol) in 1 N sodium hydroxide was left at ambient temperature for twenty minutes. The solution was then passed through a column of cationic exchange resin (Amberlite 120 A; 12 ml.) and the acidic eluent was concentrated in vacuo to give solid acid. Crystallization from methanol-ethyl acetate furnished the analytically pure material, M.P. 231–233°.

Analysis.—Calcd. for $C_6H_7NO_6$: C, 38.11; H, 3.73; N, 7.41. Found: C, 38.39; H, 3.44; N, 7.39.

EXAMPLE 10

1(S),2(S)-1-amino-2-hydroxy-1,2,3-propanetricarboxylic acid, trimethyl ester, hydrochloride [(+)-threoamine hydrochloride]

A solution of sodium azide (2.5 g.) in water (10 ml.) was added to a stirred solution of 1(S),2(S)-1-mesyloxy-2-hydroxy-1,2,3-propane tricarboxylic acid, trimethyl ester [(−)-threo-mesylate (6.56 g.) in ethanol (50 ml.). The reaction mixture was heated at reflux temperature for 45 minutes, then most of the solvent was removed in vacuo. The residue was diluted with water and extracted with chloroform (2×). The organic layers were washed with water, then were combined, dried (MgSO$_4$) and concentrated under reduced pressure to give the crude (−)-threo-azide as an oil; $[\alpha]_D^{25}$ −54.0° (c, 1.0 MeOH).

A solution of the azide (5.8 g.) in methanol (150 ml.) containing concentrated hydrochloric acid (1.8 ml.) was hydrogenated for three hours in a Parr Hydrogenator (48 p.s.i.; R.T.) using 10% palladium on charcoal (1.0 g.) as catalyst. The catalyst was removed by filtration of the reaction mixture through Celite and the filtrate was then evaporated in vacuo. The resulting solid residue was crystallized from methanol-ether to give 3.8 g. of the amine hydrochloride, M.P. 164–6°. Recrystallization from the same solvent mixture furnished the analytically pure specimen, M.P. 164–6°; $[\alpha]$+14.83° (c, 0.97, CH$_3$OH).

Analysis.—Calcd. for $C_9H_{15}NO_7 \cdot HCl$: C, 37.84; H, 5.65; N, 4.90; Cl⁻, 12.41. Found: C, 37.71; H, 5.58; N, 4.76; Cl⁻, 12.43.

The following pharmaceutical formulations are illustrated for (±)-threo-1-amino-2-hydroxy-1,2,3-propanetricarboxylic acid, trimethyl ester, hydrochloride. These formulations are applicable for all compounds of Formula Ia and Formula Ib.

EXAMPLE 11

Capsule Formulation

| | Mg. per capsule |
|---|---|
| (±)-Threo-1-amino-2-hydroxy-1,2,3-propanetricarboxylic acid, trimethyl ester, hydrochloride | 250 |
| Lactose | 60 |
| Corn starch | 35 |
| Magnesium stearate | 5 |
| Total weight | 350 |

Procedure:
(1) All of the ingredients were mixed until thoroughly blended in a suitable size container.

(2) The powder was filled into #2, two piece, hard shell gelatin capsules to an approximate fill weight of 350 mg. using a Parke Davis capsulating machine. (Any similar type machine may be used.)

EXAMPLE 12

Tablet formulation

| | Mg. per tablet |
|---|---|
| (±)-Threo-1-amino-2-hydroxy-1,2,3-propanetricarboxylic acid, trimethyl ester, hydrochloride | 200 |
| Dicalcium phosphate dihydrate, Unmilled | 235 |
| Corn starch | 70 |
| FD & C Yellow #5 aluminum lake 25% | 2 |
| Durkee 117 | 25 |
| Calcium stearate | 3 |
| Total weight | 535 |

Procedure:
(1) All the ingredients were mixed thoroughly and Fitzed (Model D), using a #1A screen, medium speed.
(2) The mixture was remixed and slugged.
(3) The slugs were screened on an oscillator through a #14 mesh screen and compressed on an "E" machine.

EXAMPLE 13

Capsule formulation

| | Mg. per capsule |
|---|---|
| (±)-Threo-1-amino-2-hydroxy-1,2,3-propanetricarboxylic acid, trimethyl ester, hydrochloride | 50 |
| Lactose, USP | 125 |
| Corn starch, USP | 30 |
| Talc, USP | 5 |
| Total weight | 210 |

Procedure:
(1) (±)-Threo-1-amino-2-hydroxy-1,2,3-propanetricarboxylic acid, trimethyl ester, hydrochloride was mixed with lactose and corn starch in a suitable mixer.
(2) The mixture was further blended by passing through a Fitzpatrick Comminuting Machine with a #1A screen with knives forward.
(3) The blended powder was returned to the mixer, the talc added and blended thoroughly.
(4) The mixture was filled into #4 hard shell gelatin capsules on a Parke Davis capsulating machine.

EXAMPLE 14

Tablet formulation

| | Mg. per tablet |
|---|---|
| (±)-Threo-1-amino-2-hydroxyl-1,2,3-propanetricarboxylic acid, trimethyl ester, hydrochloride | 25 |
| Dicalcium phosphate dihydrate, unmilled | 175 |
| Corn starch | 24 |
| Magnesium stearate | 1 |
| Total weight | 225 |

Procedure:
(1) (±)-Threo-1-amino-2-hydroxy-1,2,3-propanetricarboxylic acid, trimethyl ester, hydrochloride and corn starch were mixed together and passed through a #00 screen in Model "J" Fitzmill with hammers forward.
(2) This premix was then mixed with dicalcium phosphate and one-half of the magnesium stearate, passed through a #1A screen in Model "J" Fitzmill with knives forward, and slugged.
(3) The slugs were passed through a #2A plate in a Model "D" Fitzmill at slow speed with knives forward, and the remaining magnesium stearate was added.
(4) The mixture was mixed and compressed.

EXAMPLE 15

Tablet formulation

| | Mg. per tablet |
|---|---|
| (±) - Threo - 1 - amino - 2 - hydroxy - 1,2,3-propanetricarboxylic acid, trimethyl ester, hydrochloride | 100 |
| Lactose, USP | 202 |
| Corn starch, USP | 80 |
| Amijel B011 [1] | 20 |
| Calcium Stearate | 8 |
| Total weight | 410 |

[1] A prehydrolyzed food grade corn starch. Any similar prehydrolyzed corn starch may be used.

Procedure:

(1) (±) - Threo - 1 - amino - 2 - hydroxy-1,2,3-propanetricarboxylic acid, trimethyl ester, hydrochloride, lactose, corn starch, and Amijell B011 were blended in a suitable mixer.

(2) The mixture was granulated to a heavy paste with water and the moist mass was passed through a #12 screen. It was then dried overnight at 110° F.

(3) The dried granules were passed through a #16 screen and transferred to a suitable mixer. The calcium stearate was added and mixed until uniform.

(4) The mixture was compressed at a tablet weight of 410 mg. using tablet punches having a diameter of approximately ⅜". (Tablets may be either flat or biconvex and may be scored if desired.)

EXAMPLE 16

Tablet formulation

| | Mg. per tablet |
|---|---|
| (±) - Threo - 1 - amino - 2 - hydroxy - 1,2,3-propanetricarboxylic acid, trimethyl ester, hydrochloride | 500 |
| Corn starch | 30 |
| Lactose | 88 |
| Gelatin | 12 |
| Talcum | 15 |
| Magnesium Stearate | 5 |
| Total weight | 650 |

Procedure:

(1) (±) - Threo - 1 - amino - 2 - hydroxy - 1,2,3-propanetricarboxylic acid, trimethyl ester, hydrochloride and lactose were thoroughly mixed in suitable blending equipment and granulated with a 10% gelatin solution.

(2) The moist mass was passed through a #12 screen, and the granules were dried on paper lined trays overnight.

(3) The dried granules were passed through a #14 screen and placed in a suitable mixer. The talcum and magnesium stearate were added and blended.

(4) The granulation was compressed into tablets weighing approximately 650 mg. each, using punches having an approximate diameter of 12.7 mm. (½"). The final tablet thickness was about 5.1 mm.

EXAMPLE 17

Measurement of lipogenesis in vivo

Female Charles River rats weighing from 120–150 g. were provided free access to water and were fed a commercial diet prior to the initiation of the experiment. Each experimental group of animals were prefasted two days and then meal-fed a single meal daily from 9–12 a.m. for seven to thirteen days. The meal consisted of a 70% glucose fat-free diet (G-70) containing 70% glucose, 24% vitamin-free casein, 5% salt and 1% vitamins, to which 40 g. cellulose was added per kilogram.

On the last day of feeding, 60 minutes prior to feeding, the aminocitric acid derivative in ASV of the composition sodium chloride 0.9%, carboxy methyl cellulose 0.5%, benzyl alcohol 0.86% and Tween 80 (polyoxyethylene sorbitan monoleate) 0.39% was administered by stomach tube. Immediately after feeding, rats were lightly anaesthetized with Penthrane (methoxyflurane) and injected in the tail vein with 0.25 ml. of a solution with the following composition: 12.3 mg. alanine, 5μ$C^{14}C$-alanine (specific activity=156 mC/mmole) as fatty acid precursor and 30.6 mg. α-ketoglutarate as an transaminase acceptor dissolved in saline pH 7.4–7.6. After 30 minutes, rats were sacrificed by decapitation and their livers were excised, rapidly weighed, minced in 15 ml. water and homogenized in a Potter-Elvehjem homogenizer with 5 strokes of a drill press-driven Teflon pestle. Duplicate 3 ml. aliquots of whole liver homogenates were added to tubes containing 2.1 ml. 5 N NaOH and saponified with 2.6 ml. 5 N $H_2SO_4$ and extracted twice with 5 ml. of petroleum ether (B.P. 40–60° C.). Supernatants were added directly to glass counting vials, evaporated to dryness and 10 ml. of toluene-PPO-POPOP scintillation fluid was added. Samples were analyzed for absolute activity in a Packard Tri-carb scintillation counter. Resulting data was expressed an nanomoles$^{14}$C-alanine incorporated/gram of tissue/30 minutes.

1(S),2(S)-1-amino - 2 - hydroxy - 1,2,3 - propanetricarboxylic acid trimethyl ester hydrochloride, when administered at 2.63 mmole/kg. in ASV, gave the following results:

| Nanomoles$^{14}$C-alanine/g. liver/30 min.: | Percent inhibition |
|---|---|
| 740.4±76.2 SEM (10 rats) | 28 |

We claim:

1. A process for preparing an azide of the formula

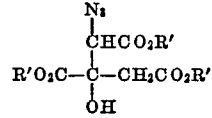

wherein all R' groups are the same lower alkyl, which comprises contacting a sulfonate ester of the formula

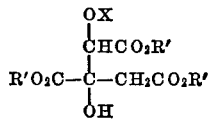

wherein R' is as above and X is lower alkyl sulfonyl or aryl sulfonyl, wherein aryl is phenyl or naphthyl which may be substituted with a halogen, lower alkyl, hydroxy, lower alkoxy or nitro group, with an alkali metal azide in an inert organic solvent.

2. The process of claim 1 wherein the azide produced has the same relative stereochemistry as the starting sulfonyl ester.

3. The process of claim 1 wherein the alkali metal azide is sodium azide and X is methanesulfonyl.

4. The process of claim 1 wherein the temperature is between 50° and 100° C.

References Cited
UNITED STATES PATENTS 3,470,233   9/1969   Bohn et al. _____ 260—349 X R JOHN M. FORD, Primary Examiner U.S. Cl. X.R.

260—534 M, 482 P, 326.5 F; 424—274, 313, 319

UNITED STATES PATENT OFFICE
CERTIFICATE OF CORRECTION

Patent No. 3,799,951　　　　Dated March 26, 1974

Inventor(s) Robert William Guthrie and Richard Wightman Kierstead

It is certified that error appears in the above-identified patent and that said Letters Patent are hereby corrected as shown below:

Page 1, Reaction Scheme A –

(Ia-1)

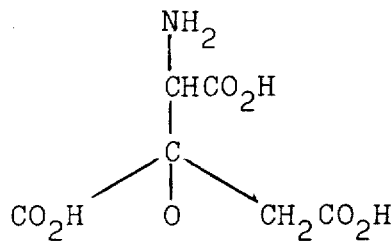

should be --

(Ia-1)

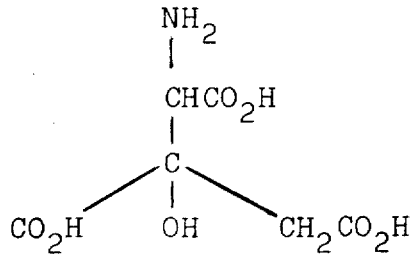

Signed and sealed this 29th day of October 1974.

(SEAL)
Attest:

McCOY M. GIBSON JR.　　　　　　C. MARSHALL DANN
Attesting Officer　　　　　　　Commissioner of Patents